United States Patent [19]

Truhan

[11] 4,224,900
[45] Sep. 30, 1980

[54] METHOD FOR RAISING BIRDS AND APPARATUS FOR CARRYING OUT SUCH METHOD

[76] Inventor: Andrew Truhan, P.O. Box 467, Granite Falls, N.C. 28630

[21] Appl. No.: 4,872

[22] Filed: Jan. 19, 1979

Related U.S. Application Data

[63] Continuation-in-part of Ser. No. 841,482, Oct. 12, 1977, Pat. No. 4,151,811.

[51] Int. Cl.³ .................... A01K 31/18; A01K 31/20
[52] U.S. Cl. ........................................ 119/21; 119/33; 119/28
[58] Field of Search .................. 119/1, 21, 33, 34, 31, 119/28

[56] References Cited

U.S. PATENT DOCUMENTS

| | | | |
|---|---|---|---|
| 927,467 | 7/1909 | Fargo | 119/28 |
| 1,447,460 | 3/1923 | Beatty | 119/22 |
| 1,837,065 | 12/1931 | Pierce | 119/31 |
| 2,223,358 | 12/1940 | Olson et al. | 119/33 |
| 2,910,044 | 10/1959 | King et al. | 119/1 |
| 2,963,004 | 12/1960 | Pockman et al. | 119/51 |
| 3,718,118 | 2/1973 | Bibler | 119/16 |
| 3,805,743 | 4/1974 | Crowder | 119/82 |
| 3,809,014 | 5/1974 | Jones et al. | 119/28 |
| 3,815,550 | 6/1974 | Becker | 119/28 |
| 3,826,230 | 7/1974 | Jones et al. | 119/28 |
| 4,018,271 | 4/1977 | Jones et al. | 119/28 X |

*Primary Examiner*—Hugh R. Chamblee
*Attorney, Agent, or Firm*—Harold L. Stowell

[57] ABSTRACT

The galliformes such as chickens are raised in a housing having a plurality of intercommunicable rooms, each of the rooms, except the first two, comprising progressively larger areas and each of said rooms including the first two being provided with independently controlled heating, ventilating, lighting, watering and feeding means, and means for progressively moving the birds sequentially through each such room at a rate such that the birds are at a predetermined maturity upon departure from the last of the rooms. In a preferred embodiment the floors of each room are heated and the floor of each room except the first two are corregated so that the bodies of the birds are generally not in contact with droppings and moisture in the droppings is rapidly evaporated.

4 Claims, 19 Drawing Figures

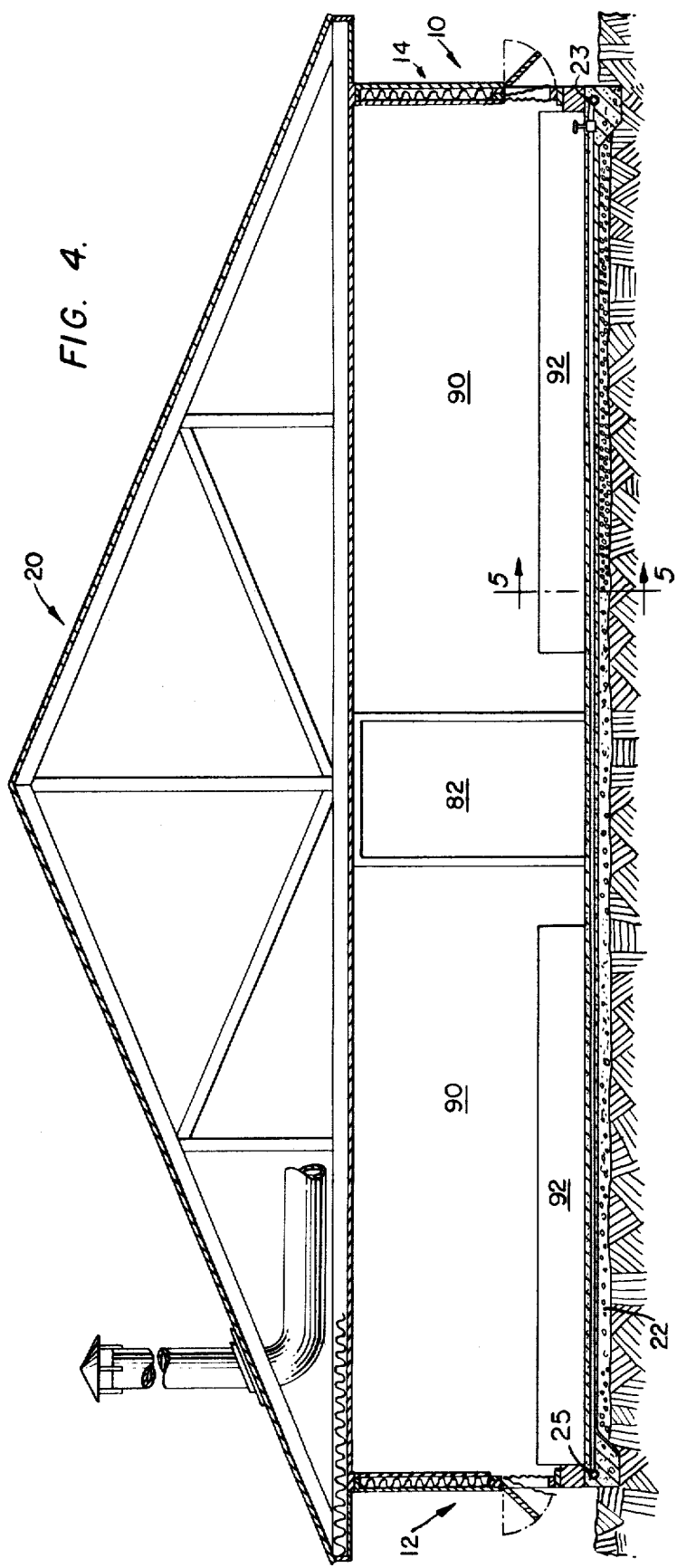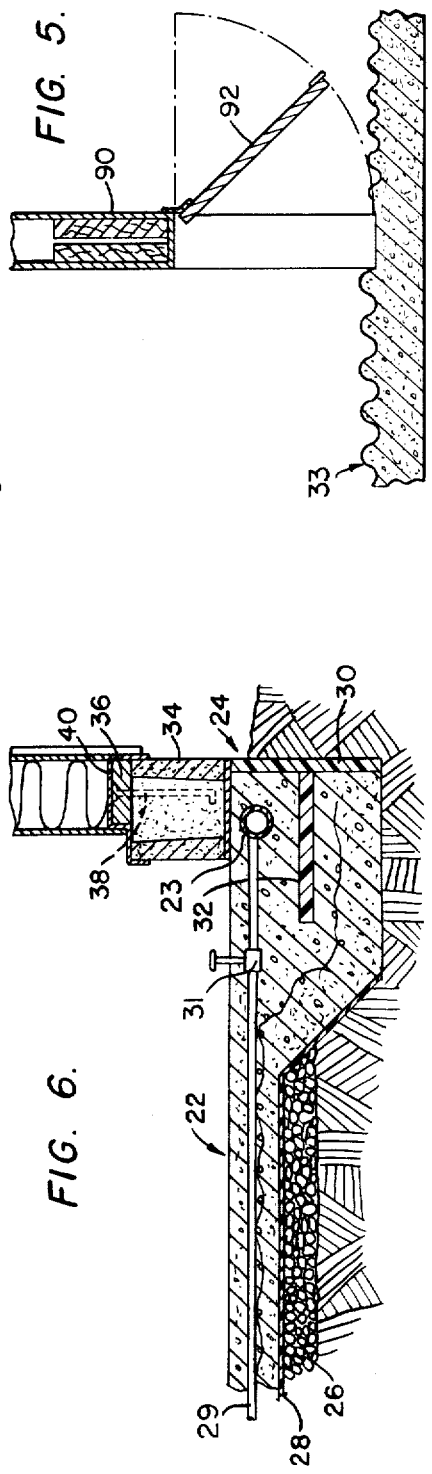

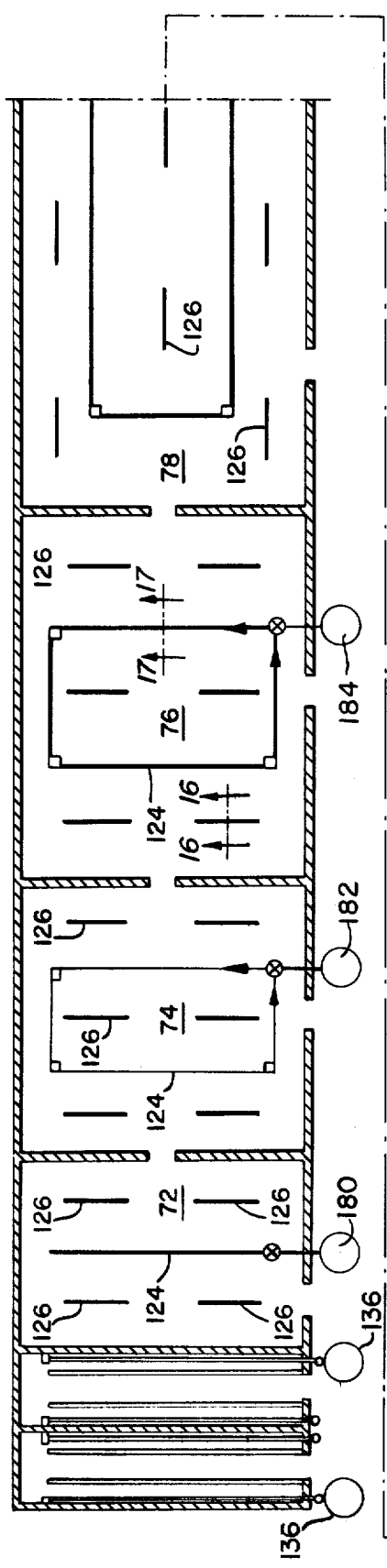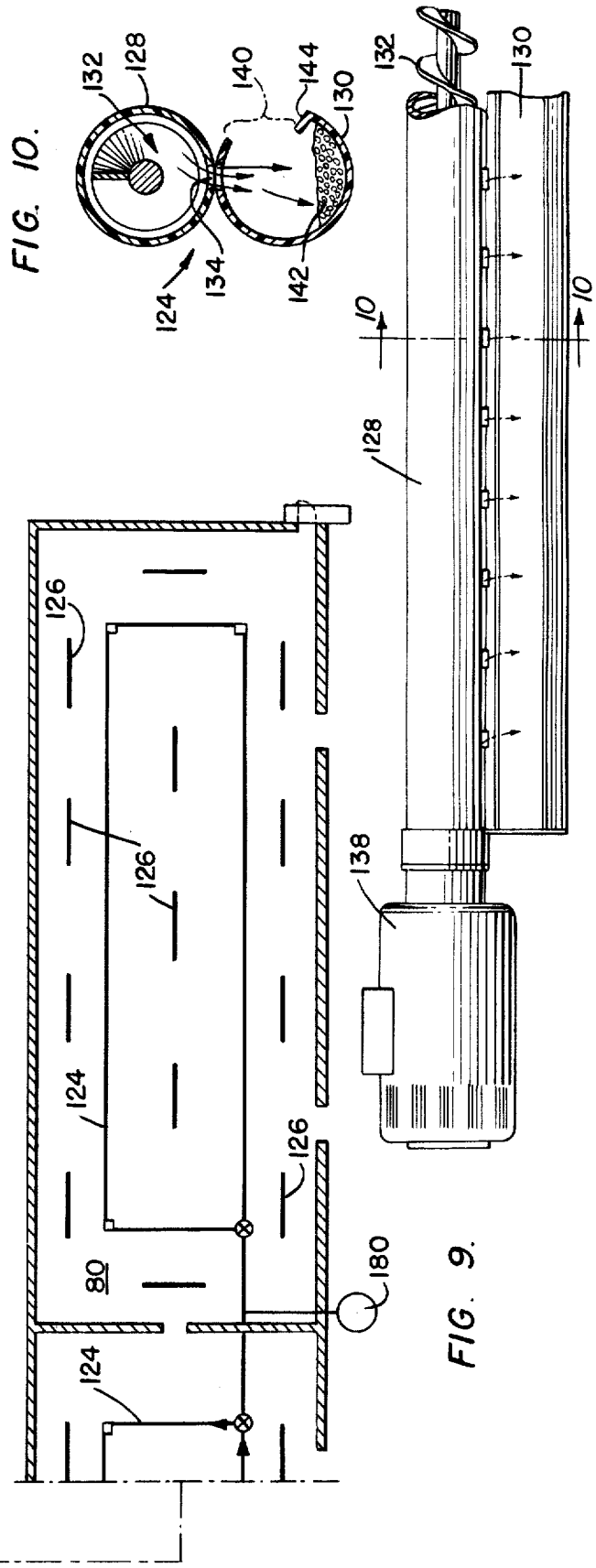

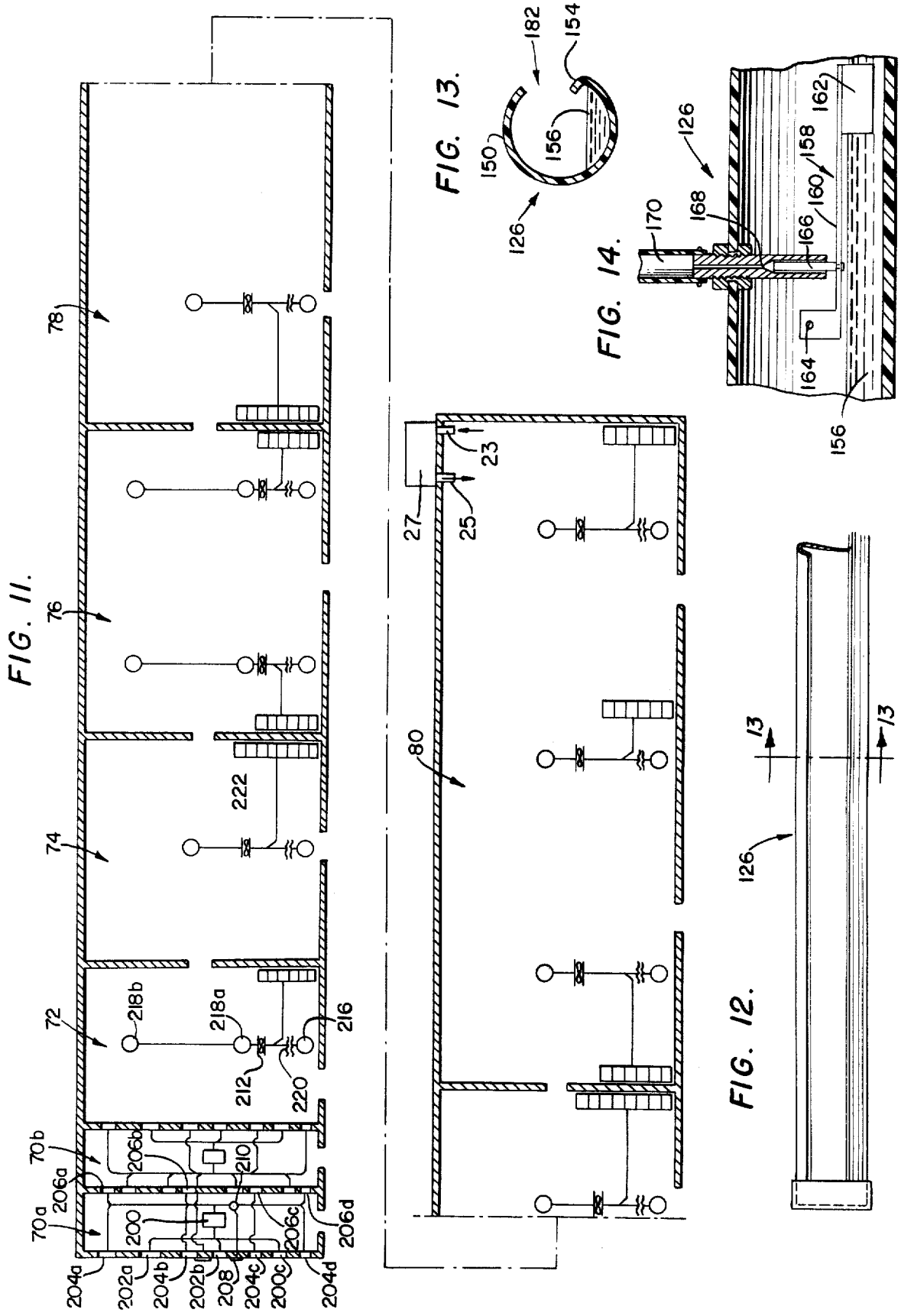

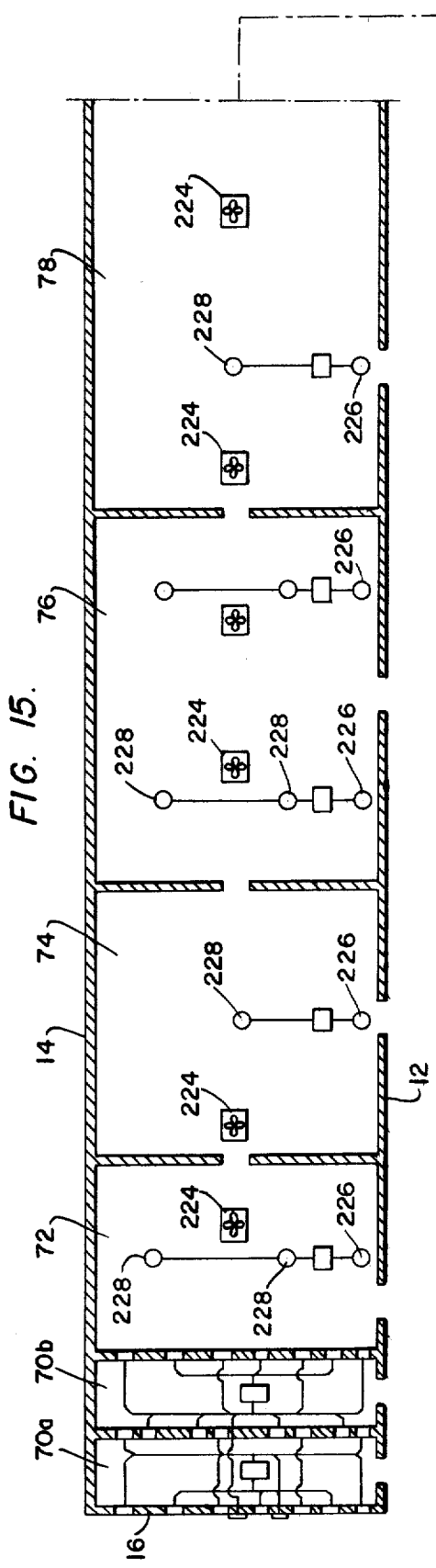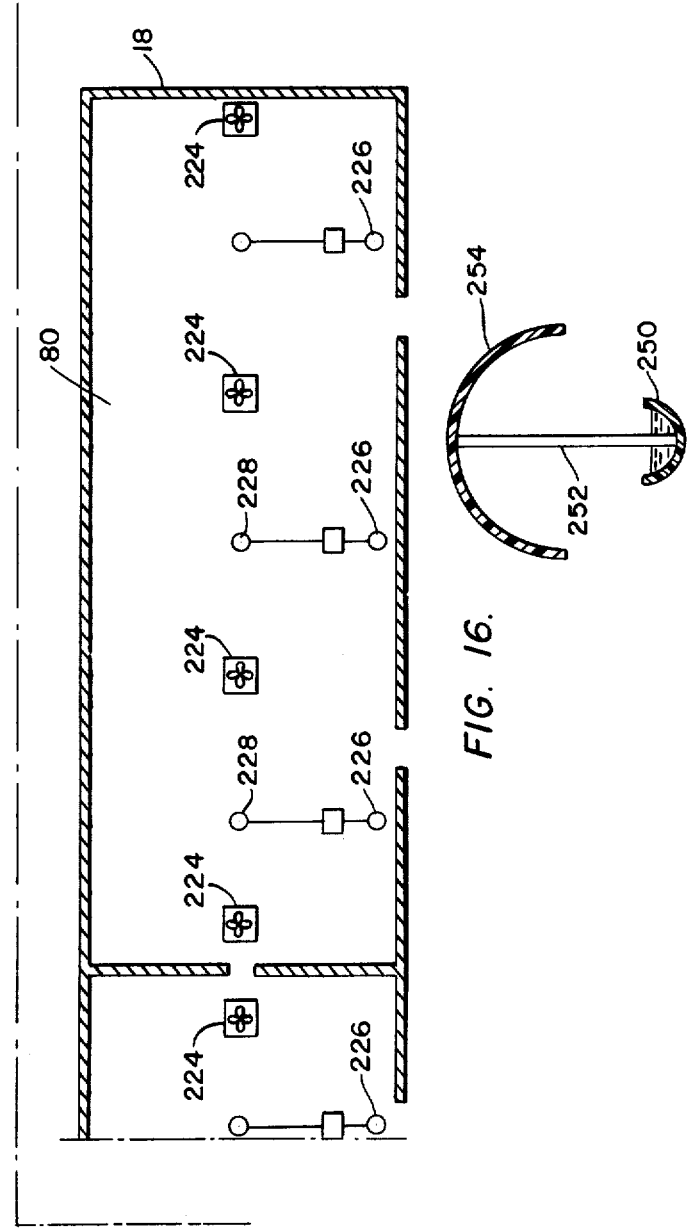

METHOD FOR RAISING BIRDS AND APPARATUS FOR CARRYING OUT SUCH METHOD

CROSS-REFERENCE TO RELATED APPLICATION

This application is a continuation-in-part of my application Ser. No. 841,482, filed Oct. 12, 1977, now U.S. Pat. No. 4,151,811, for "Method for Raising Small Animals and Particularly Birds and Apparatus for Carrying Out such Method."

BACKGROUND OF THE INVENTION

1. Field of the Invention

This invention is directed to a method of raising galliformes such as chickens whereby substantially larger numbers of birds can be raised in the space normally employed at a substantially less cost per matured bird and to apparatus for carrying out the method.

2. Description of the Prior Art

One frequently employed method of raising chickens is to place chicks in a house or enclosure comprising a single room and to remove the birds seven weeks later at which stage the birds are ready for market. In one chicken growing area of this country, the single housing would be, for example, 300 feet long and 40 feet wide, into which 16,000 chicks are placed and the survivors thereof are removed at the end of seven weeks. It will be appreciated that the entire housing must be heated to a relatively high temperature or maintained at a relatively high temperature when the birds are first placed in the housing and particularly during summertime substantially cooling must be provided for the house after the chicks have grown to substantial size birds. Further, it will be appreciated that it is only possible to clean the chicken house at the most every seven weeks and all of the remaining of the 16,000 chicks must be removed at the same time. Such conditions are unfavorable for maximum bird survival, wasteful of energy and space and the birds are subjected to conditions which are conducive to the development of breast blisters and sore eyes, and the conditions are such that they promote growth of flies and unhealthful odors.

In my co-pending application, Ser. No. 841,482, certain of said problems with prior art systems are overcome by raising small animals and particularly the galliformes such as chickens in a housing having a plurality of intercommunicable rooms, each of the romms comprising progressively larger zones or areas and each of the zones are provided with independently controlled, heating, ventilating, lighting and feeding means and means are provided for progressively moving the small animals sequentially through each of the zones at a rate such that the animals are at a predetermined maturity upon departure from the last of the rooms or zones.

SUMMARY OF THE INVENTION

The present invention provides method and apparatus whereby production of birds is substantially increased through better spaced utilization, a system which substantially eliminates breast blisters through reduction of irritants present in the growth areas; reduces substantially the energy consumption in heating and cooling the housing area; improves waste and litter handling; reduces bird handling; provides for flexibility in feed, water and lighting control; improves litter cleanup; diseases are materially reduced, thereby materially reducing or eliminating the need for high level dosages of antibiotics in the bird feed or water; the birds are maintained on a flooring which reduces body contact with bird droppings; a portion of the heat for the housing is provided via radiant heat through the floor which in turn provides for rapid moisture removal from the bird droppings and the like, all as to be more fully described hereinafter.

BRIEF DESCRIPTION OF THE DRAWING

The invention will be particularly described in reference to the accompaying drawing wherein:

FIG. 4 is an enlarged section on line 4—4 of FIG. 1 showing inlet and outlet headers for one form of radiant floor heating means;

FIG. 5 is an enlarged fragmentary sectional view on line 5—5 of FIG. 4, illustrating a preferred form of floor corregations;

FIG. 6 is a fragmentary sectional view on line 6—6 of FIG. 2 showing in detail an inlet header, heating pipes and control valves for a form of the radiant heating means;

FIG. 8 is a sectional plan view of the housing structures shown in FIGS. 1 through 4 illustrating feeding and watering systems in the housing structure;

FIG. 9 is an enlarged fragmentary view of a portion of the feeding structure illustrated in FIG. 8;

FIG. 10 is a section on line 10—10 of FIG. 9;

FIG. 11 is a sectional view in plan of the air control system for the structures shown in FIGS. 1 through 4;

FIG. 12 is a view of a portion of the watering system for the housing structure;

FIG. 13 is a section on line 13—13 of FIG. 12;

FIG. 14 is an enlarged fragmentary sectional view of the automatic flow control means for the watering system of the invention;

FIG. 15 is a view like FIGS. 8 and 11 of a portion of a modified form of heating system of the invention;

FIG. 16 is a vertical sectional view through a modified watering system for use in the housing structure of the invention;

FIG. 17 is a fragmentary sectional view through a modified feeding mechanism for the housing structure of the invention;

DESCRIPTION OF THE PREFERRED EMBODIMENTS OF THE INVENTION

Figure 1:
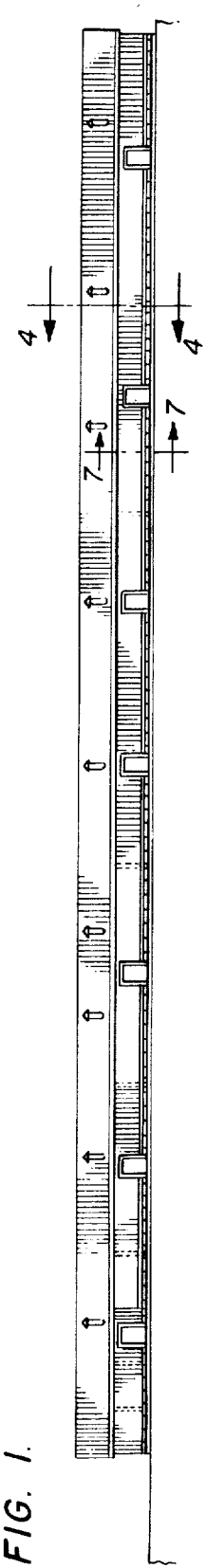
FIG. 1 is an elevational view of a small animal-raising structure embodying the principles of the present invention.

Referring to the drawing, 10 generally designates a housing for raising galliformes such as chickens. By way of illustration, the house may have a length of about 300 feet and a width of about 40 feet, being a standard housing for raising 16,000 chickens to eatable birds in a period of seven weeks. The illustrated house has a height of approximately 17 feet to the ridge and approximately 7 feet to the eave line. The housing has sidewalls 12 and 14, end walls 16 and 18 and roof structure 20. The housing structure 10 is constructed on a concrete or the like slab 22 which, as illustrated in FIG. 6, is of reinforced concrete construction. The major portion of the slab 22 is approximately four inches thick and laid on crushed gravel 26 with a vapor barrier such as a sheet of polyethylene between the gravel or earth and the slab.

Figure 7:
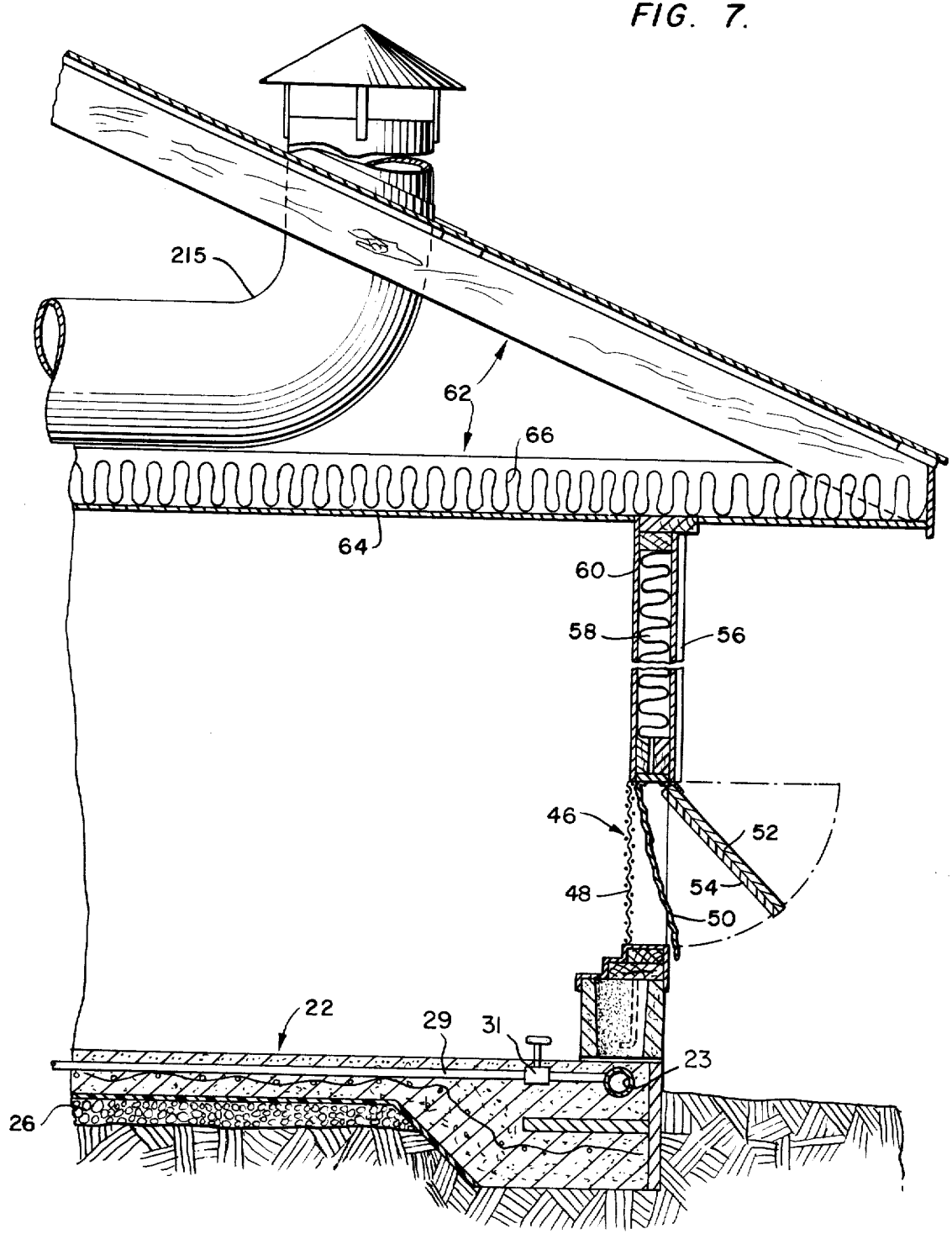
FIG. 7 is an enlarged fragmentary sectional view on line 7—7 of FIG. 1.

Adjacent the marginal edges of the slab are footing elements 24 having a depth of, for example, 12 inches and rigid insulating slabs 30 and 32, are formed in conjunction therewith. Marginally about the slab 22 are cinder or concrete blocks 34 which anchor plates or headers 36 via conventional anchor rods 38. Again, flashing, such as illustrated at 40, is provided over the headers 36. About the two long sides 12 and 14 of the building structure are a plurality of openings generally designated 48. The openings are provided with screens on the interior side and designated 48, a canvas drop flap or the like 50 and hinged doors having an external surface formed, for example, of three-quarter inch external grade plywood 52 and an internal insulation of fiber or mineral board 54. The remainder of each of the four walls of the housing is constructed of metal such as galvanized metal or aluminum siding 56, approximately three inches of fiberglass insulation 58 and an interior finish panel 60, each of which is more clearly illustrated in FIG. 7 of the drawing.

The ceiling construction comprises conventional truss members 62 and a lower ceiling 64. Between the ceiling and about the 2"×6" truss members is from about three to five inches of fiberglass fill 66 for insulation purposes.

Figure 2:
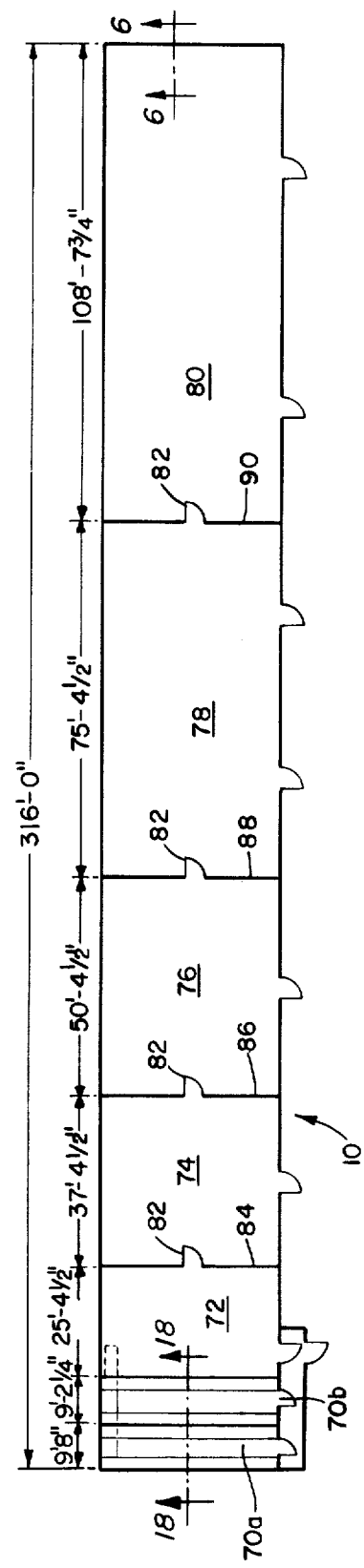
FIG. 2 is a plan view in section of the housing illustrated in FIG. 1.
Figure 3:
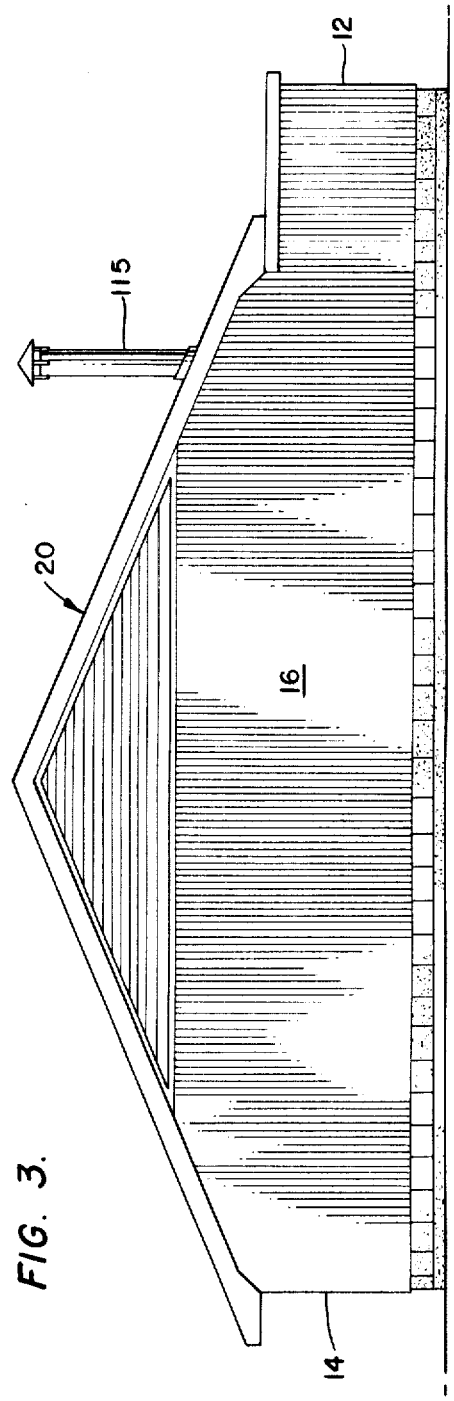
FIG. 3 is an end elevational view of the building structure shown in FIGS. 1 and 2.

As more clearly shown in FIG. 2, the housing structure 10 is divided into a plurality of independent rooms by transverse partitions. In the illustrated form of the invention, the housing is divided into seven separate zones designated 70a, 70b, 72, 74, 76, 78 and 90. It will be noted from FIG. 2 that each of the separate zones increases in length except the first two 70a and 70b in which the baby chicks are matured during the first two weeks in the housing structure. Each of the zones 70a and 70b has a length of approximately nine feet whereas zones 72, 74, 76, 78 and 80 have lengths of approximately 25 feet, 37 feet, 50 feet, 75 feet, and 108 feet, respectively. Thus, as the chickens increase in size, the zone in which they are housed is increased in length to accommodate such size increase. It is contemplated as disclosed in my co-pending application that chicks placed in zone 70a would be removed from zone 80 as mature birds, ready for market, in seven weeks.

Referring particularly to FIGS. 4 through 7 and 11, a portion of the heat provided for each room or zone 72 through 80 is provided by radiant floor heating. The radiant floor heating accomplishes several unique and beneficial results, including but not limited to material reduction in, or elimination entirely of the high antibiotic ingestion of birds to reduce deseases caused by the birds being maintained in constant contact with their droppings, which as the birds mature, builds up in layers which together with the moisture content thereof provides an ideal fungus and bacterial growth media. In order to eliminate these situations, at the time of pouring the floor 22, a pair of longitudinal headers 23 and 25 extend from, for example, a hot water heater 27, FIG. 11, the length of the house defined by rooms or zones 72 through 80. These headers are cross connected by a plurality of heater pipes 29, which heater pipes are provided with flow control valves 31, FIGS. 6 and 7, so that the flow rate of the heating medium may be individually controlled. In the illustrated form of the invention the control valves 31 are of the manual type, however, it will be recognized by those skilled in the art that automatic electric thermostatic type control means may be provided in the cost directed heater pipes 29. In general, the floors are maintained in a range of from about 65° to 85° F. maximum, and with a low range of 55° to 65°. The preferred range being from 80° F. to about 85° F. Such heat is sufficient to provide a portion of the entire heat control for the various rooms, and at the same time to provide a source of heat for drying the chicken droppings, thereby reducing breast burn and the growth of bacteria and fungus.

In addition to the beneficial affects of the radiant floor heating means rooms 72 through 80 are cast with corregated surfaces such as illustrated more particularly in FIG. 5. In FIG. 5, floor portion 33 to the left of partition 90, differs in height and amplitude of the corregation from floor 35 to the right of partition 90. It has been found that as the birds mature larger amplitude corregations having a greater spacing therebetween should be employed on the floor. The peaks of the corregation provide standing or roosting surfaces for the birds while the bird's droppings are collected in the troughs of the corregation to be dried by the heat supplied via the inlet header 23 in conjunction with the outlet header 25, and the cross pipes 29. It has been found that for the younger birds in, for example, zones 72 and/or 74, the spacing of the corregations of about ¼ inch with amplitudes of about ¼ inch would be satisfactory, and as the birds mature and move to rooms 76, 78 and 80, the corregations could be increased to those having amplitudes and depths of about ¾ inch wherein the last zone or room 80 the spacing between corregations could be about one inch with amplitudes of about one inch. No corregations or heated floors would be employed in zones 70a and 70b.

Each of the zones 72 through 80 is interconnected by doorways 82 in partitions 84, 86, 88 and 90, and further as illustrated in FIGS. 4 and 5, each of the partitions is provided with openable transversely extending doors such as door 92 for partition 90 which permit progressive movement of the chickens from one zone to the next during the weekly transfer of the birds, all as to be more fully described hereinafter.

Figure 18:
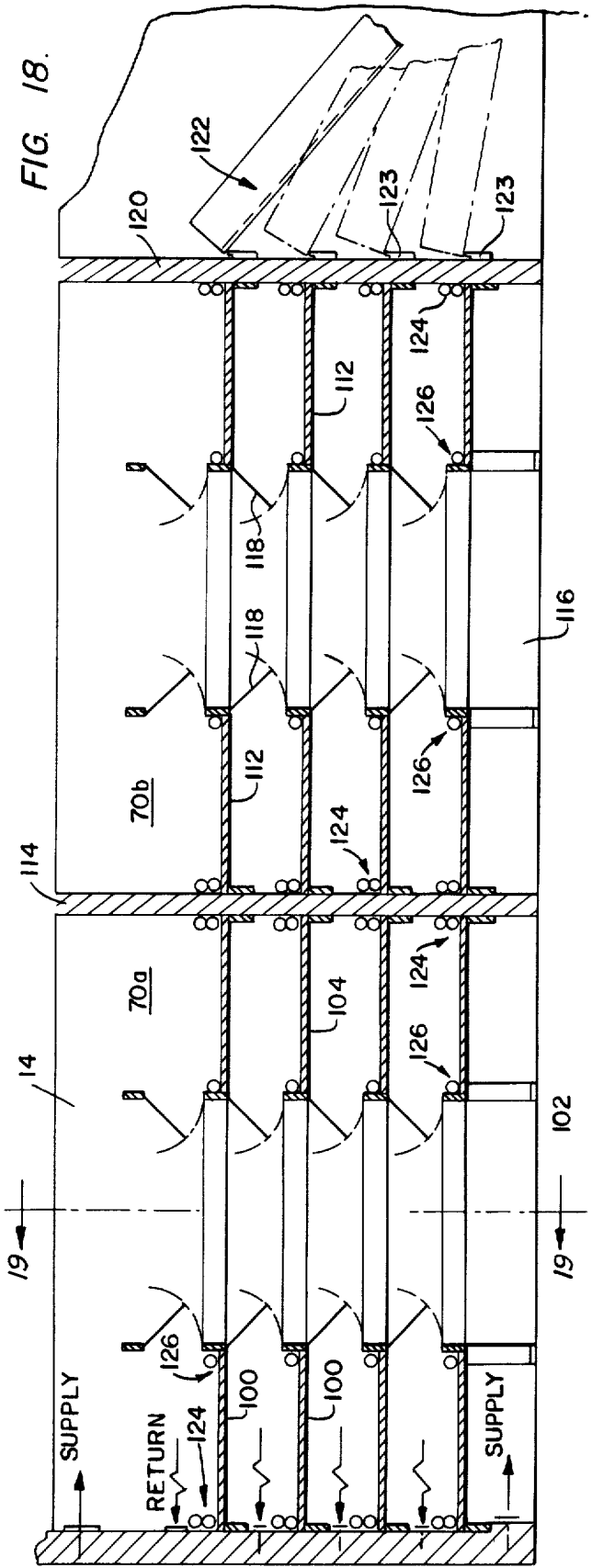
FIG. 18 is a section on line 18—18 of FIG. 2 of the drawings.
Figure 19:
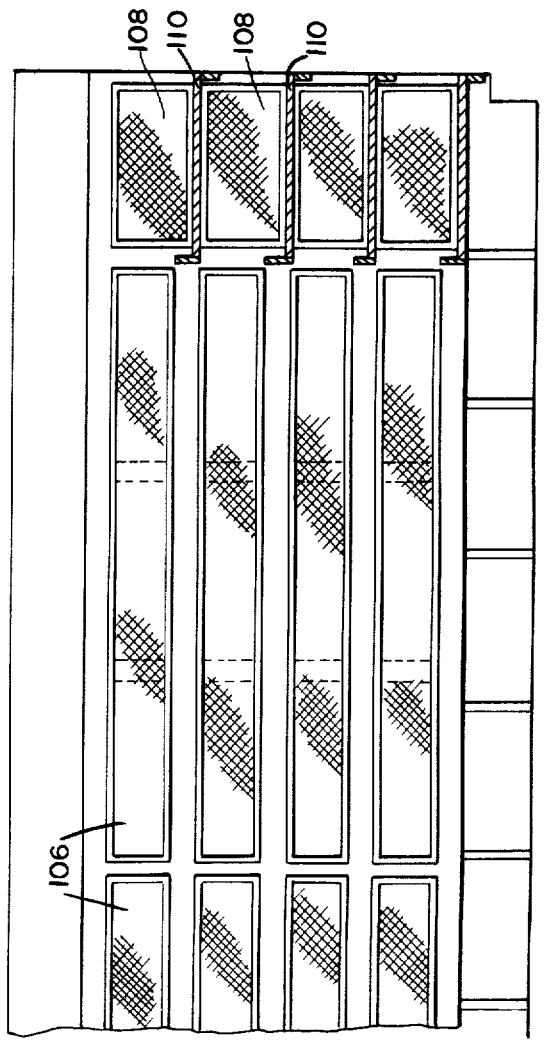
FIG. 19 is a fragmentary section on line 19—19 of FIG. 18.

Referring particularly to FIGS. 18 and 19, zones 70a and 70b are for the small chicks and zone 70a consists of eight trays or subzones about 32 inches in width and 32 feet in length, that is, extending the entire width of the housing structure. Four of the eight trays 100 are positioned on one side of an isle 102 and another four trays 104 are on the opposite side of isle 102. Each of the trays is provided with access doors 106 having framing and screen fronts. With the eight shelves of the size indicated, approximately 5,700 newly hatched chicks are placed relatively uniformly distributed on the shelves.

At the end of the trays or shelves toward housing wall 14 are small doors with screening designated 108, which lead to platforms 110 and which, in turn, lead to the various shelves 112 of zone 70b through corresponding swingable passageways in partition 114 separating zones 70a and 70b.

Zone 70b is like zone 70a with its eight shelves, four on each side of isle 116, and each of the zones defined by the shelves 112 is provided with plural hinged openings 118 and openable doors, not shown, in partition 120. The openable doors in partition 120 would communicate with one or more portable slides generally designated 122 which are supported on ledges 123 as illustrated in FIG. 18 to permit the two-week old chicks to move from shelves 112 of room 70b into the zone 72, again, all as more fully to be described hereinafter.

Each of the trays or stacked sub-zones in zone 70a is provided with feeding means generally designated 124 and watering means generally designated 126. The feeding means as is more clearly shown in FIGS. 9 and 10 consist of a pair of longitudinally extending tubular elements 128 and 130. The units run the length of the trays and conduit 128 has mounted therein a screw conveyor 132.

Tube 130 is connected to tube 128 by clamp means, welding or the like and tube 128 communicates with the interior of tubular member 130 via a plurality of openings 134 whereby, when feed maintained in the feed bins 136 is transported by the screw conveyor 132, driven by motor means 138 (which may be time controlled in operation by means not illustrated) the feed for the chicks is distributed to the lower trough means 130. As more clearly illustrated in FIG. 10, the lower trough 130 is open in a zone designated 140 so that the chicks can reach the food 142, but not enter the trough where they would be likely to soil the food supply. Further, it will be noted that the lower edge 144 of the trough 130 is inturned so that during the feeding process there is less likelihood of spillage.

The water supply means 126 for the chicks is of relatively simple construction, details of which are illustrated in FIGS. 12, 13 and 14. Each of the watering devices 126 consists of a tubular conduit similar in configuration to feed conduit 130 and the conduit designated 150 has an open space 152 the edge of which 154 is inturned, again to reduce water spillage. The opening 152 is so sized that the chicks can insert their head and not their bodies to again reduce water pollution. The water level 156 in each of the water troughs 150 is automatically maintained at the desired level by a float arrangement 158 consisting of a pivoted float arm 160, a float 162 which are pivotally connected at 164 to the walls of the conduit 150. Intermediate the point of pivotal connection 164 and the float 162 there is attached to the pivot rod 160 a valve pin 166 which valve pin functions in valve bore 168 of a water supply tube 170. It will be seen from FIG. 14 that as the water 156 lowers, float 162 moves downwardly moving with it valve pin 168, permitting the flow of water from the supply conduit 170 to enter the drinking chamber.

As is known in the production of chickens, as the birds mature, different types of feed are required and, to this end, as illustrated in FIG. 8, zone 72 is provided with its feed supply 80; zone 74 is provided with its feed supply 82; zone 76 is provided with its feed supply 84 and zones 78 and 80 are provided with a common feed supply 180.

It will also be noted from FIG. 8 that the extent of the feed tubes in each such zone increases in length whereby to accommodate the increase in size of the birds and their rate of feed input. Basically, each feed unit in zones 72, 74, 76, 78 and 80 is similar to that illustrated in reference to zones 70a and 70b as illustrated in detail in FIGS. 9 and 10.

Also illustrated in FIG. 8 are the plural watering means 126 which are like the watering means in zones 70a and 70b as illustrated in FIGS. 12, 13 and 14.

The improved bird housing and raising structure is also provided with unique heating and/or cooling or ventilating means with independently controllable systems for zones 70a and 70b and 72, 74, 76, 78 and 80. The necessity or desirability for the independent units is that as the birds mature and are moved into the larger living zones, larger heating, cooling and ventilating equipment is required.

One useful system is illustrated in FIG. 11. In zone 70a, FIG. 11, 200 generally designates a heating and/or cooling, filtering and blower unit. Heated and/or cooled and filtered air from the unit 200 is directed to vertical ducts 202a, b and c which have louvered outlets at each of the shelves to the left of isle 201 via suitable ducting. Return air is directed to the unit 200 via vertical conduits and louvered inlets 204a, b, c and d on the right-hand side of isle 102. Fresh air is brought into the system via inlet 208 and the amount of fresh air brought into the system is controlled by a manual or automatic valve 210 as to be further described hereinafter.

It is calculated that to provide the necessary movement of air for the chicks in zone 70a, approximately about a one-horse power capacity motor would be required. A substantially identical heating, cooling, ventilating and filtering system is provided for zone 70b.

In zone 72 there is a system for circulating approximately 3600 cubic feet per minute of air in the zone. The air in part comprises recirculated air passing through filter bank 214 and partly fresh air via stack 216 connected to the ambient atmosphere by means illustrated as vent stack 215, FIG. 7 of the drawing.

The output from the fan 212 is passed, in substantially equal amounts, to the pair of diffusers 218a and 218b. The outside air brought in via stack 215 may be heated or cooled, in heating and/or cooling coil 220 connected to a suitable heater or cooler with the capacity of the coil being rated at about 850 cubic feet per minute.

In the fourth zone 74, a similar system is disclosed having an output capacity for the filter 222 of about 5400 cubic feet per minute and the heating or cooling coil has a capacity of about 11 CFM.

The fifth zone 76, being of substantially larger size, is provided with two indpendent heating and/or cooling and filtering systems each having a maximum rated capacity of approximately 1700 CFM.

Zone 78 is also provided with two units, each being rated at about 4700 CFM, whereas the last of the zones 80 is provided with three independent units each being rated at about 3400 CFM. It will be particularly noted that each individual unit includes its own filter, outlet diffusers, fans, heating and/or cooling coils and stack for bringing in ambient air or exhausting air from the zone.

The system described in reference to FIG. 11 is one that would readily provide optimum conditions in the breeding structure. However, such optimum conditions are only obtainable employing a relatively expensive initial installation cost. Where a simpler heating and/or cooling system is necessitated by cost factors, one such system is illustrated in FIG. 15. In FIG. 15, the two zones 70a and 70b where the chicks spend the first and second weeks of their growth period and during which the chicks are very vulnerable to diseases brought about by not maintaining proper temperature conditions, the heating, cooling and filtering mechanisms would be identical to those described in reference to FIG. 11. However, after the birds have matured past the second week, FIG. 15 illustrates a simpler control plan wherein zones 72 and 74 are each provided with a ceiling exhaust fan 224; zone 76 is provided with two ceiling exhaust fans 224; zone 78 is provided with three such fans and zone 80 is provided with four such fans. These fans may be provided with automatic back-draft dampers of conventional design to maintain a heat level within each room not greater than a predetermined temperature.

Fresh air is brought into each of the zones via roof chimneys whereafter the air passes through heating and or cooling coils 228 having suitable fan means associated therewith from which the heated and/or cooled ambient air is directed to diffusers 228, the number of which is determined by the capacity of the blowers associated therewith and by way of example, it is considered that zone 72 should have a total output capacity in the neighborhood of about 1000 CFM; zone 74 should have an output capacity of about 1200 CFM; zone 76 should have a capacity of about 2000 CFM; zone 78 again about 2000 CFM and zone 80 about 3000 CFM.

AIR HANDLING SYSTEM OPERATION #1

The system illustrated in FIG. 11 provides continuous positive ventilation in each of the spaces or zones. A thermostat, not shown, located in each of the spaces controls the temperature of the space by modulating a heating coil and/or outside air together with return air.

The design is based on a maximum winter condition of 0° F. outside and 90° F. inside for zones 70a and 70b and 70° F. inside for spaces 72, 74, 76, 78 and 80.

When the outside temperature is 0° F., a minimum of outside air is introduced through the air handling system. The temperature in the space is controlled by the thermostat modulating the heating coil in the outside air ductwork. On a rise in temperature outside, the heating coil control starts modulating to a closed position, the outside air control will modulate open and the return air will modulate to close.

On a further rise in temperature, the outside air control louvers will modulate to a maximum open position, the return air will modulate to a closed position, and the heating coil will be in a closed position. All air will be introduced through ceiling air diffusers 218.

On a rise in space temperature in zones 78 and 80 to 85° F. the air systems will automatically shut off. A time delay switch, not shown, will keep the fan off for approximately 1 minute. At that time, contacts will make and cause the fan to reverse itself and restart. The system will then act as an exhaust system in place of supplying air.

The air will be drawn through the perimeter louver and the outside air change rate at this time would be approximately 45 times per hous.

On a drop in temperature, the reverse will take place.

AIR HANDLING SYSTEM OPERATION #2 SPACES 72-80

The system illustrated in FIG. 15 provides continuous positive ventilation in the spaces or zones. A thermostat, not shown, located in each of the spaces, controls the temperature of the space by modulating a heating coil 225 located adjacent the outside air makeup duct.

The heating coil will modulate open any time there is a call for heating in the space. The outside air is introduced continuously.

When the temperature rises above the desired conditions, the exhaust fans 224 will cycle.

While in FIGS. 9, 10, 12, 13, and 14 preferred feeding and watering structures are disclosed, FIGS. 16 and 17 illustrate alternate constructions wherein, in FIG. 16 a watering trough of hemi-cylindrical configuration designated 250 is shown supporting from its internal wall, via suitable spacers 252, a hemi-cylindrical cover 254 which restricts body access of the birds into the liquid through 250 thereby reducing to a minimum bird carried pollution of the water. Each trough 250 is provided with suitable liquid level maintaining mechanisms which may include the mechanical float structures shown in FIG. 14 of the drawing.

The feeding structure shown in FIG. 17 consists of a lower, hemi-cylindrical trough 256 above which is suspended a hemi-cylindrical shield 258 which carries a conveyor 260 having mounted therein a screw flight 262. The ends of the screw conveyor are connected to a feed bin and motor drive mechanism. Spaced along the tube 260 are a plurality of depending tubular or the like chutes 264 which deposit feed from the conveyor 262 to the lower trough 256 as illustrated in FIG. 17. The upper shield 258 prevents the birds from contaminating the food in the lower, hemi-cylindrical trough 256.

EXAMPLE

An example of the function of the improved housing structure hereinbefore described as applied to raising chickens from newly hatched chicks to mature marketable birds is as follows. In the illustrated housing, having the illustrated dimensions, approximately 5,700 newly hatched chicks are placed in the eight trays in zone 70a. One week later, the passage between zone 70a and 70b is opened and the week-old chicks are moved into the eight shelves in zone 70b. This is readily accomplished by extinguishing the lights, not shown, in 70a and turning on the lights in zone 70b. The chicks are maintained in zone 70b for one week and then transferred to zone 72.

When the chicks move from zones 70a to 70b, zone 70a is cleaned and replenished with a further flock of 5,700 chicks. When zone 70b is evacuated, then the zone 70b is cleaned. One week after the chicks have been in zone 72 they are moved to zone 74 again by turning off the lights in zone 72 and turning them on in zone 74. When zone 74 has received the birds from zone 72, zone 72 is then cleaned. Such progressive movement of the birds continues for a seven-week period. This procedure of moving the birds from the first into second and then into the third and then into the fourth, fifth, sixth and seventh zones continues until, at the beginning of the seventh week, the housing contains approximately 39,900 chicks and chickens. At the end of the seventh week, the mature birds in zone 80 are directed from the zone where they are crated and shipped to the processing plant.

It will thus be seen that, once a cycle has been completed, thereafter, each week approximately 5,700 birds are marketed. Thus, after a complete cycle, 39,900 birds are grown from chicks to maturity each seven weeks instead of the 16,000 birds conventionally raised in a chicken house 300 by 40 feet in a substantially more economical and environmentally favorable manner.

It will be particularly appreciated by those skilled in the art that preparing from shipping 5,700 birds per week is highly preferably to preparing for shipment at one time 16,000 birds in an open zone 300 feet long by 40 feet wide.

In the specific example, the chickens are raised from chicks to marketing maturity in seven weeks. Where longer or shorter periods are desired, a greater or lesser number of living zones are provided in each housing.

While preferred forms of the present invention have been shown and described, it will be appreciated that various modifications may be made in the basic structures without departing from the scope of the present invention as defined in the claims thereof.

I claim:

1. A structure for raising small animals and particularly the galliformes such as chickens comprising a housing having a plurality of intercommunicable rooms, each of the rooms except the first two thereof comprising progressively larger areas, each of said rooms including the first two thereof being provided with independently controlled heating, ventilating, watering and feeding means, means for progressively moving the small animals sequentially through each such room at a rate such that the animals are at a predetermined maturity upon departure from the last of the rooms, a concrete slab for the housing, said first two intercommunicable rooms each including a plurality of shelves or sub-zones in a stacked array upon which baby chicks mature during the first two weeks of maturation, wherein each of the intercommunicable rooms is adapted to house the birds for a one-week term, and wherein the heating, cooling and filtering means for each room is sized in relation to the size of the room and the maturity of the birds, and wherein the heating means comprises radiant heating means provided in the concrete slab, and comprises hot water piping and includes valve means to maintain the concrete slab at a temperature from about 65° to 85° F., and further wherein the concrete slab is corregated and the corregations range in amplitude from about ¼" to about 1", and the spacing between the corregations is from about ¼" to about 1".

2. The invention defined in claim 1 wherein the outer sidewalls of each of the rooms are provided in part with controllable louvers.

3. The invention defined in claim 1 wherein each feeding and watering means comprises independent feed and watering troughs so constructed as to reduce to a minimum introduction of bird-carried contaminants into the food and water.

4. The invention defined in claim 1 wherein the housing is erected on a concrete slab.

* * * * *